(12) United States Patent
Rittmann et al.

(10) Patent No.: US 10,466,085 B2
(45) Date of Patent: Nov. 5, 2019

(54) DEVICE AND METHOD FOR DETERMINING A MASS FLOW OF A FLUID, AND METHOD FOR PRODUCING SUCH A DEVICE

(71) Applicant: Robert Bosch GmbH, Stuttgart (DE)

(72) Inventors: Michael Rittmann, Ditzingen (DE); Uwe Konzelmann, Asperg (DE); Norbert Schneider, Tiefenbronn (DE)

(73) Assignee: Robert Rosch GmbH, Stuttgart (DE)

( * ) Notice: Subject to any disclaimer, the term of this patent is extended or adjusted under 35 U.S.C. 154(b) by 2 days.

(21) Appl. No.: 14/815,631

(22) Filed: Jul. 31, 2015

(65) Prior Publication Data

US 2017/0030752 A1 Feb. 2, 2017
US 2017/0176229 A9 Jun. 22, 2017

(30) Foreign Application Priority Data

Aug. 25, 2014 (DE) .......................... 10 2014 216 867

(51) Int. Cl.
*G01F 1/69* (2006.01)
*G01F 1/696* (2006.01)
*G01F 5/00* (2006.01)
*G01F 1/684* (2006.01)
*G01F 1/76* (2006.01)
*G01F 1/692* (2006.01)

(52) U.S. Cl.
CPC ................ *G01F 1/69* (2013.01); *G01F 1/684* (2013.01); *G01F 1/696* (2013.01); *G01F 1/76* (2013.01); *G01F 5/00* (2013.01); *G01F 1/6842* (2013.01); *G01F 1/692* (2013.01)

(58) Field of Classification Search
CPC . G01F 1/69; G01F 1/696; G01F 1/684; G01F 1/6965; F02D 41/28; F02D 41/02; F02D 41/26
USPC ............................. 73/204.11–204.15, 114.32
See application file for complete search history.

(56) References Cited

U.S. PATENT DOCUMENTS

| | | | | |
|---|---|---|---|---|
| 4,884,215 A | * | 11/1989 | Zboralski | G01F 1/684 |
| | | | | 702/47 |
| 5,211,056 A | * | 5/1993 | Takamoto | F02D 41/187 |
| | | | | 73/114.34 |
| 5,911,238 A | * | 6/1999 | Bump | G01F 1/6842 |
| | | | | 137/486 |

(Continued)

*Primary Examiner* — Peter J Macchiarolo
*Assistant Examiner* — Timothy P Graves
(74) *Attorney, Agent, or Firm* — Norton Rose Fulbright US LLP; Gerard Messina

(57) ABSTRACT

A device for determining a fluid mass flow includes a sensor element for acquiring the fluid, the sensor element being configured within a flow path of the fluid to provide a sensor signal, an integrated circuit having an operating unit for providing an operating signal for operating the sensor element and a conversion unit for converting the sensor signal into a converted signal, the integrated circuit including a first discrete circuit element having a first terminal for receiving the sensor signal, a second terminal for providing the operating signal, and a third terminal for providing the converted signal, and a signal processing unit to determine, using the converted signal, the mass flow of the fluid, the signal processing unit including a second discrete circuit element having a first terminal for receiving the converted signal and a second terminal for providing a mass flow signal representing the mass flow.

16 Claims, 3 Drawing Sheets

(56) References Cited

U.S. PATENT DOCUMENTS

| | | | |
|---|---|---|---|
| 6,763,711 B1 * | 7/2004 | Nair | G01F 1/696 |
| | | | 73/204.15 |
| 6,769,298 B2 * | 8/2004 | Matsumura | F02D 41/187 |
| | | | 702/57 |
| 2006/0265151 A1 * | 11/2006 | DuHack | G01F 1/696 |
| | | | 702/53 |
| 2012/0041572 A1 * | 2/2012 | Halsall | H04L 12/40032 |
| | | | 700/19 |
| 2012/0232809 A1 * | 9/2012 | Steckling | G01F 1/696 |
| | | | 702/45 |

* cited by examiner

DEVICE AND METHOD FOR DETERMINING A MASS FLOW OF A FLUID, AND METHOD FOR PRODUCING SUCH A DEVICE

RELATED APPLICATION INFORMATION

The present application claims priority to and the benefit of German patent application no. 10 2014 216 867.8, which was filed in Germany on Aug. 25, 2014, the disclosure of which is incorporated herein by reference.

FIELD OF THE INVENTION

The present invention relates to a device and to a method for determining a mass flow of a fluid, and to a method for producing such a device.

BACKGROUND INFORMATION

In motor vehicles, air mass sensors can be used to maintain a particular air-fuel ratio. For this purpose, an air mass flow to an internal combustion engine can be acquired and can be outputted as an electrical signal to a regulation and control electronics unit. In this way, an injection quantity can be adapted to a momentary power requirement, to an air pressure, and to various air temperatures.

German patent document DE 197 30 580 A1 discusses, for example, a device for determining the flow volume through an engine, the device having a signal evaluation circuit having a heat regulator in the form of a digital module.

SUMMARY OF THE INVENTION

Against this background, the approach presented here presents a device and a method for determining a mass flow of a fluid, as well as a method for producing such a device, as recited in the main claims. Advantageous embodiments result from the respective subclaims and from the following description.

The approach of the present invention provides a device for determining a mass flow of a fluid, the device having the following features:

a sensor element for acquiring the fluid, the sensor element being situated and fashioned within a flow path of the fluid in order to provide a sensor signal;

an integrated circuit having an operating unit for providing an operating signal for operating the sensor element, and having a conversion unit for converting the sensor signal into a converted signal, the integrated circuit being realized as a first discrete circuit element having a first terminal for receiving the sensor signal, a second terminal for providing the operating signal, and a third terminal for providing the converted signal; and a signal processing unit that is fashioned to determine, using the converted signal, the mass flow of the fluid, the signal processing unit being realized as a second discrete circuit element having a first terminal for receiving the converted signal and a second terminal for providing a mass flow signal representing the mass flow.

A mass flow can be understood as a mass of the fluid that flows past the sensor element per time unit. A sensor element can be understood for example as a thermal sensor element in the form of a wire or a film resistor. A fluid can be understood as a gas or gas mixture, such as air. For example, the fluid can be the intake air of an internal combustion engine. The sensor element can be fashioned to acquire at least one physical property of the fluid and/or a physical property, influenced by the fluid, of the sensor element. The sensor signal can indicate the acquired physical property of the fluid or of the sensor element. A physical property of the fluid can for example be understood as a pressure, a temperature, or a humidity of the fluid. A physical property of the sensor element can for example be understood as a temperature or an electrical conductivity of a surface of the sensor element around which the fluid flows. For example, the surface can be cooled by the fluid flowing over it, so that the electrical conductivity of the surface changes. Such a change can be used for the determination of a mass flow of the fluid. A discrete circuit element can for example be a component in a housing. The terminals of the discrete circuit elements can be external terminals, for example pins or solder pads, via which the discrete circuit elements can be connected in electrically conductive fashion to external lines, for example to printed conductors on a circuit board for bearing the discrete circuit elements. The discrete circuit element can be an ASIC element in the form of an integrated circuit having a specified range of functions. The sensor signal of the sensor element can represent a measurement value of the physical property of the fluid and/or a measurement value of the change in the physical property of the sensor element. A converted signal can be understood as a signal of the sensor element prepared for further processing or for storage. For example, the sensor signal can be an analog input signal that is converted by the conversion unit into digital data or a data stream. The operating unit can be fashioned to provide energy to the sensor element. For example, the operating unit can be fashioned to regulate a power consumption of the sensor element as a function of a power output of the sensor element. The first terminal and the third terminal of the first discrete circuit element can represent signal transmission interfaces that differ from one another, and in particular are incompatible with one another.

The present approach is based on the recognition that the individual functions of an electronics unit of an air mass sensor can be realized through modules that are separate and are therefore capable of being combined flexibly with one another. For this purpose, in contrast to conventional solutions, only a converter and the basic modules required for the operation of a sensor are integrated into an application-specific integrated circuit, or ASIC.

Through such a partitioning of the electronics, a sensor functionality, as well as electric interfaces to a control device, can be expanded or changed quickly and at low cost compared to conventional solutions in which, in addition to an interface controller, the sensor functionality, i.e. the signal processing, is also formed in the ASIC, without having to develop a new ASIC in a very time-intensive and expensive process.

According to a specific embodiment of the approach proposed here, the sensor element can be capable of being heated electrically. In addition, the sensor element can have an electrical resistance that is a function of the fluid, and the sensor signal can represent the electrical resistance of the sensor element. The operating unit can be fashioned to provide the operating signal for controlling a heating power of the sensor element. The operating unit can be fashioned to control a heating power of the sensor element. The conversion unit can be fashioned to convert the sensor signal representing a change of an electrical resistance of the sensor element into the converted signal. For example, the sensor element can be fashioned as a thermal anemometer. A heating power can be understood as a power consumed by the sensor element for the heating of the sensor element. Through the fluid flowing along the sensor element, a temperature, and thus an electrical resistance, of the sensor element can change. The operating unit can for example be fashioned as a heat regulator in order to regulate the heat power in accordance with a strength of the fluid flow, in such a way that a temperature of the sensor element remains constant. Correspondingly, the signal processing unit can be fashioned to determine the mass flow as a function of a change of the heating power. In this way, the mass flow can be determined very reliably and precisely.

The conversion unit can be realized as an analog-digital converter. An analog-digital converter can be understood as an electronic circuit for converting analog input signals into digital data, or a data stream. In this way, storage and further processing is enabled of the measurement values supplied by the sensor element.

The signal processing unit can be realized as a microcontroller. A microcontroller can be understood as a semiconductor component. The microcontroller can have an integrated storage device and various interfaces that enable a programming of the microcontroller. Through the use of a microcontroller, the functionality of the device can be expanded very easily, rapidly, and at low cost, via software.

It is also advantageous if, according to a further specific embodiment, the first discrete circuit element of the integrated circuit, and in addition or alternatively the second discrete circuit element of the signal processing unit, is realized as an SMD component. For example, the integrated circuit and the signal processing unit can be realized having an SMD housing. In this way, the ASIC element and the signal processing unit can be accommodated on a circuit board very easily and in space-saving fashion.

The device can be provided with at least one interface unit that is fashioned to receive the mass flow signal provided at the second terminal of the signal processing unit, to adapt it to an interface protocol of a control device that can be connected after the interface unit, and to output it as a signal that can be read in by the control device and that represents the mass flow. An interface unit can be understood as an electronic component that enables an exchange of data between the signal processing unit and an external control device. For example, the interface unit can be fashioned to wirelessly transmit the signal representing the mass flow to the control device. Due to the fact that the interface unit represents a unit of the device separate from the second discrete circuit element integrated circuit, an interface functionality of the device can be adapted to various applications very flexibly and at low cost.

According to a further specific embodiment, the device can be provided with a circuit board, a base plate, and a sensor element bearer, in order to form a sensor module. For this purpose, the ASIC element, the signal processing unit, and, optionally, the interface unit can be situated on the circuit board. The circuit board can be situated on the base plate. The sensor element can be situated on the sensor element bearer, the sensor element bearer being fastened on the base plate. A circuit board can be understood as a board having printed conductors for the electrically conductive connection of the ASIC element, the signal processing unit, and the interface unit. A base plate can be understood as a plate for fixing the circuit board. A sensor element bearer can be understood as a tab-shaped element for fastening the sensor element. Through this specific embodiment, the electronic components of the device can be combined to form a compact module with a low production outlay.

In addition, the device can be provided with a housing for accommodating the sensor module. The housing can have at least one fluid channel, and at least the sensor element can be situated in the fluid channel. A fluid channel can be understood as a channel for conducting the fluid through the housing. The housing can protect the device from damage.

It is advantageous if, according to a further specific embodiment, the device is provided with at least one further sensor element that is electrically heatable and is situated outside a flow path of the fluid. The operating unit can be fashioned in order to additionally control a heating power of the further sensor element. The conversion unit can be fashioned to convert a signal representing a change of an electrical resistance of the further sensor element into a reference signal. The signal processing unit can be fashioned to determine the mass flow additionally using the reference signal. A flow path can be understood as a region of the device through which the fluid flows. Using the additional sensor element, measurement imprecision due to temperature fluctuations can be compensated. In addition, this specific embodiment offers the advantage of a high frequency resolution.

A method for determining a mass flow of a fluid includes the following steps:

acquisition of the fluid using a sensor element situated within a flow path of the fluid, and provision of a sensor signal;

receiving of the sensor signal at a first terminal of a first discrete circuit element, provision of an operating signal for operating the sensor element at a second terminal of the first discrete circuit element, and conversion of the sensor signal into a converted signal, and provision of the converted signal at a third terminal of the first discrete circuit element; and receiving of the converted signal at a first terminal of a second discrete circuit element, determination of the mass flow of the fluid using the converted signal, and provision of a mass flow signal representing the mass flow at a second terminal of the second discrete circuit element.

The method can advantageously be carried out using the named device.

Finally, the approach presented here creates a method for producing a device according to one of the specific embodiments described above, the method including the following steps:

provision of the sensor element, of the ASIC element, and of the signal processing unit; and electrically conductive connection of the ASIC element to the sensor element and to the signal processing unit.

The approach presented here is explained in more detail below on the basis of the accompanying drawings.

DETAILED DESCRIPTION

Figure 1:
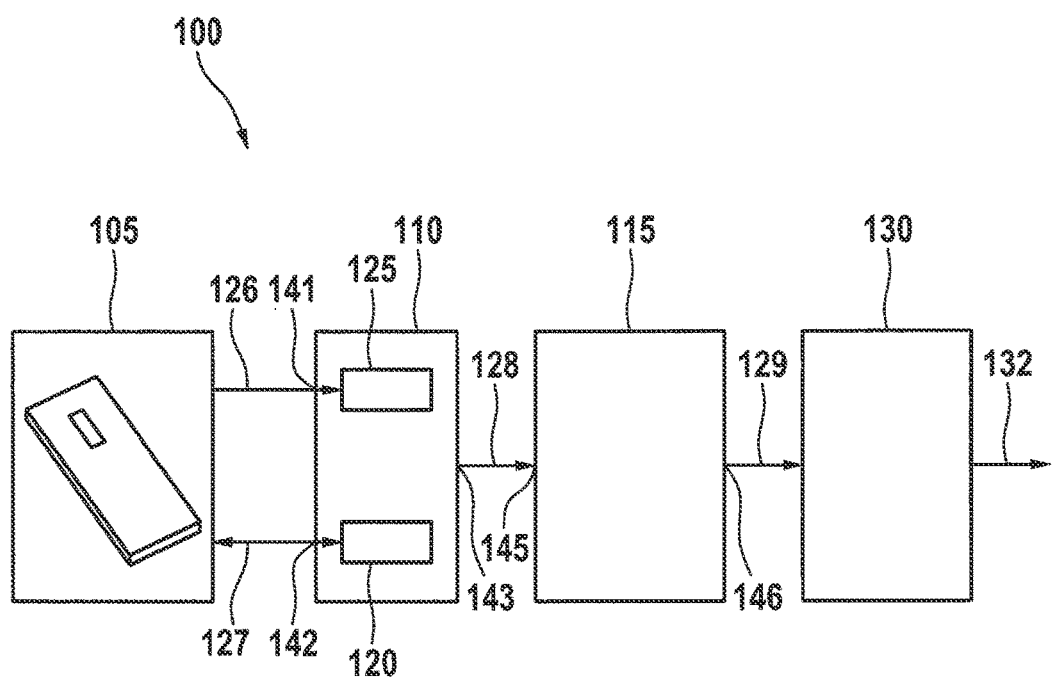
FIG. 1 shows a schematic representation of a device according to an exemplary embodiment of the present invention.

In the following description of advantageous exemplary embodiments of the present invention, identical or similar reference characters are used for elements that are shown in the various Figures and that have similar functions, and the description of these elements is not repeated.

FIG. 1 shows a schematic representation of a device 100 for determining a mass flow of a fluid according to an exemplary embodiment of the present invention. Device 100 includes a sensor element 105, an integrated circuit 110 realized as a first discrete circuit element, and a signal processing unit 115 realized as a second discrete circuit element. Integrated circuit 110 has an operating unit 120 and a conversion unit 125, each electrically coupled to sensor element 105. For example, the first discrete circuit element of integrated circuit 110 can be realized as an ASIC element.

Sensor element 105 can be situated, or can be capable of being situated, in a fluid stream. Sensor element 105 is fashioned to provide a sensor signal 126 that represents a measurement value of a physical property of the fluid, such as a pressure, a temperature, or a humidity, or a physical property of sensor element 105. According to an exemplary embodiment, sensor element 105 is realized as a heating element whose temperature can be regulated by operating unit 120. Correspondingly, the sensor signal can represent a change in the power consumption of the sensor element that is a function of an intensity of the fluid flow, where the power consumption can be greater the stronger the fluid flow is. For the operation of sensor element 105, operating unit 120 is fashioned to provide an operating signal 127 to sensor element 105.

Conversion unit 125 is fashioned to receive sensor signal 126 from sensor element 105 and to transmit it in a form suitable for further processing or for storing the measurement values represented by sensor signal 126 in signal processing unit 115, or for forwarding the measurement values represented by sensor signal 126 to signal processing unit 115, in the form of a converted signal 128. According to an exemplary embodiment of the present invention, conversion unit 125 is fashioned as an analog-digital converter.

Signal processing unit 115 is fashioned to determine a mass flow of the fluid using the measurement values of converted signal 128, and to provide a mass flow signal 129 representing the mass flow. According to an exemplary embodiment of the present invention, signal processing unit 115 is realized as a microcontroller.

In FIG. 1, device 100 is shown with an optional interface unit 130 that is fashioned to receive an item of information concerning the determined mass flow from signal processing unit 115, in the form of mass flow signal 129. This information can be outputted by interface unit 130 as a signal 132 that can be read by an external control device (not shown here). The control device can for example be an engine control device of a motor vehicle.

Signal processing unit 115 can be connected to ASIC element 110 and to interface unit 130 via standard output interfaces.

Thus, device 100 has at least two, and according to this exemplary embodiment three, components that are to be produced separately, each of which fulfills a specific function. ASIC element 110 is used for acquisition and preparation of measurement values, signal processing unit 115 determines the mass flow on the basis of the prepared measurement values, and interface unit 130 is used to transmit the determined mass flow. By individually exchanging these components, the functional scope of device 100 can be modified very easily and at low cost.

According to this exemplary embodiment, sensor element 105, integrated circuit 110, signal processing unit 115, and interface unit 130 are situated as separate circuit elements at a distance from one another and are connected to one another via electrical lines. For this purpose, the circuit element that includes integrated circuit 110 has a first terminal 141 for receiving sensor signal 126, a second terminal 142 for providing operating signal 127, and a third terminal 143 for providing converted signal 128. Correspondingly, the circuit element that includes signal processing unit 115 has a first terminal 145 for receiving converted signal 128 and a second terminal 146 for providing mass flow signal 129. Terminals 141, 142, 143 can be brought out, as electrical contacts, from a housing of the circuit element that includes integrated circuit 110. Correspondingly, terminals 145, 146 can be brought out, as electrical contacts, from a housing of the circuit element including signal processing unit 115. Terminals 141, 142, 143, 145, 146 can further be used for the mechanical fastening of the circuit elements, for example via solder connections.

Sensor signal 126 and converted signal 128 can differ in a signal standard used for the data transmission. Correspondingly, converted signal 128 and mass flow signal 129, as well as mass flow signal 129 and signal 132, can respectively differ in a signal standard used for the data transmission. For example, an interface defined according to a first standard can be assigned to the first terminal of the circuit element including integrated circuit 110, and an interface defined according to a second standard can be assigned to the second terminal of the circuit element including integrated circuit 110.

The use of digital interfaces in engine control devices results in an increasing number of different electrical interfaces for sensors in the drive train. While today analog and frequency interfaces are predominantly used, it is probable that in the future interfaces such as SENT, CAN, LIN, or PSI5 will also be used.

The sensor partitioning shown in FIG. 1 permits a low-cost and flexible solution for different electrical interfaces and sensor functionalities. According to an exemplary embodiment, the sensor partitioning includes four elements, namely sensor element 105, integrated circuit 110 in the form of an ASIC 110 having an operating unit 120 in the form of a heating regulator 120 and having a conversion unit 125 in the form of one or more ADCs (analog-to-digital converters) 125, signal processing unit 115 in the form of a microcontroller 115, and interface unit 130 in the form of an interface controller 130. ASIC 110, microcontroller 115, and interface controller 130 can be housed components that can be placed and soldered on a circuit board using SMD placement technology.

In ASIC 110 there are located all the basic modules that are necessary for the operation of sensor element 105 of an air mass sensor, and for acquiring measurement data.

The further signal processing takes place in microcontroller 115 itself. Microcontroller 115 has an integrated storage device and is programmable. In this way, the functionality of the sensor can be expanded very easily, quickly, and at low cost via software. Thus, a client-individual adaptation of the functionality is also possible. Microcontroller 115 can be a standard component that is commercially available in various configuration and power ratings. Microcontroller 115 can have a plurality of standard interfaces, such as SPI or I2C. Via these interfaces, additional satellite sensors, such as pressure and humidity sensors, can very easily be integrated into the system.

Interface controller 130 enables device 100 to communicate with the control device. Interface controller 130 can be selected as a function of a desired interface to the control device. For example, interface controller 130 can be suitable for currently used digital interfaces.

Figure 2:
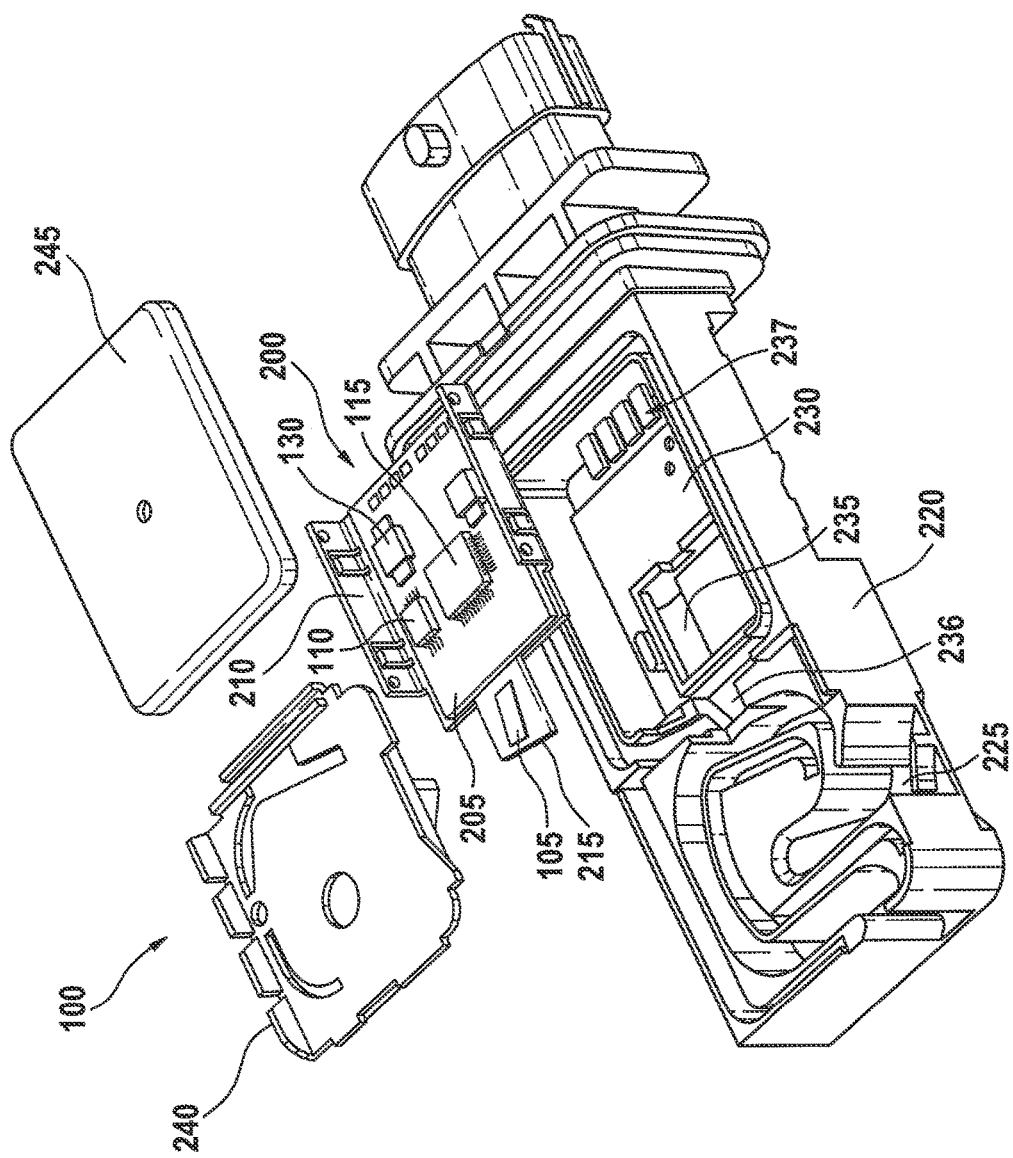
FIG. 2 shows a schematic three-dimensional representation of a device according to an exemplary embodiment of the present invention.

FIG. 2 shows a schematic three-dimensional representation of a device 100 according to an exemplary embodiment of the present invention. Differing from FIG. 1, device 100 shown in FIG. 2 is realized with a sensor module 200, also called an electronics module. Sensor module 200 includes a circuit board 205 onto which ASIC element 110, signal processing unit 115, and interface unit 130 are soldered alongside other electronic components. In addition, sensor module 200 has a base plate 210 in the form of a sheet on which circuit board 205 is fixed. For example, in FIG. 2 base plate 205 is realized on two sides situated opposite one another with an edge bent at a right angle. On base plate 210 there is fastened a tab-shaped sensor element bearer 215 on which sensor element 105 is situated.

Sensor element bearer 215 is for example made of plastic.

Device 100 further has a housing 220 having a fluid channel 225 and a module opening 230 for accommodating sensor module 200. Module opening 230 can also be designated an electronics space. Through fluid channel 225, a fluid stream can be conducted to sensor element 105. For example, device 100 with housing 220 is fashioned as an insertion sensor.

A base surface of module opening 230 has a cooling opening 235. Module opening 230 is fluidically connected to fluid channel 225 via a bypass channel 236, so that the fluid can flow between fluid channel 225 and cooling opening 235. In this way, sensor module 200 can be cooled by the fluid stream.

Sensor module 200 can be situated in module opening 230 in such a way that sensor element bearer 215 extends through bypass channel 236 into fluid channel 225. In this way, the fluid can flow around sensor element 105.

Fluid channel 125 runs in U-shaped fashion through housing 220, the openings of fluid channel 225 being fashioned at different sides of housing 220.

Housing 220 has, in the region of module opening 230, terminal contacts 237 that are used for the electrical contacting of circuit board 205.

In addition, housing 220 is realized having a measurement channel cover 240 for covering fluid channel 225 and bypass channel 236, as well as an electronics space cover 245 for covering module opening 230.

According to an exemplary embodiment, air mass sensor 100 shown in FIG. 2 is realized with a sensor chip (CMF) 105 as sensor element, glued into sensor bearer 215. Sensor bearer 215 forms a unit together with base plate 210 made of metal. In addition to sensor 105, an electronics unit 200, on its circuit board 205, is glued onto base plate 210. On circuit board 205 there is situated an evaluation IC 110, realized as an ASIC, in which the acquisition and preparation of measurement values of sensor element 105 takes place. The outputting of the measurement quantities takes place through an electric interface 130 to a control device. Interface 130 can be an analog interface or an FAS interface. Sensor 105 can be connected to the electronics of circuit board 205 through bonded connections. The resulting electronics module 200 can be glued into sensor housing 220. The overall insertion sensor 100 can be closed with covers 240, 245.

A sensor partitioning, as shown in FIG. 2, permits a low-cost and flexible solution for various electrical interfaces and sensor functionalities.

Figure 3:
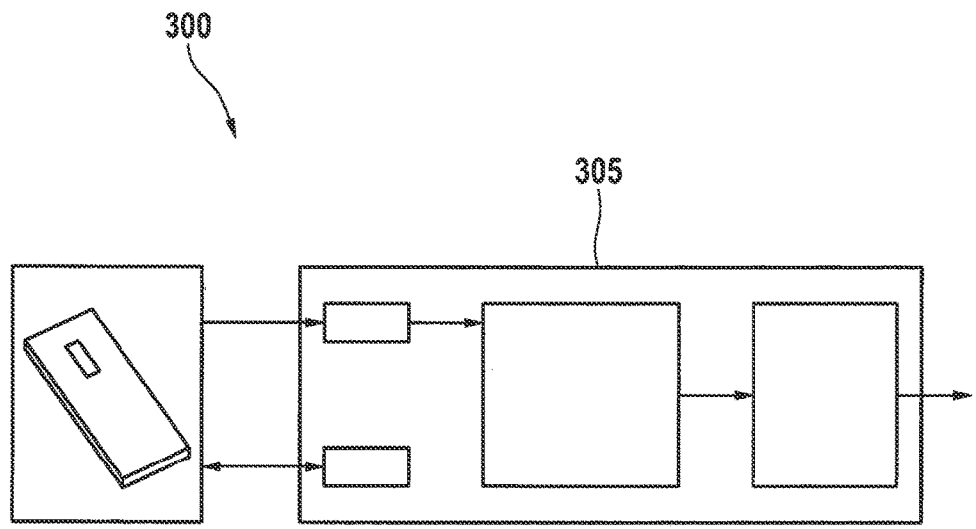
FIG. 3 shows a schematic representation of a conventional device for determining a mass flow of a fluid.

FIG. 3 shows a schematic representation of a conventional device 300 for determining a mass flow of the fluid. Differing from device 100 shown in FIGS. 1 and 2, device 300 shown in FIG. 3 is realized with an application-specific integrated circuit 305 that has, in addition to the sensor functionalities, an interface controller.

Figures 4, 5:
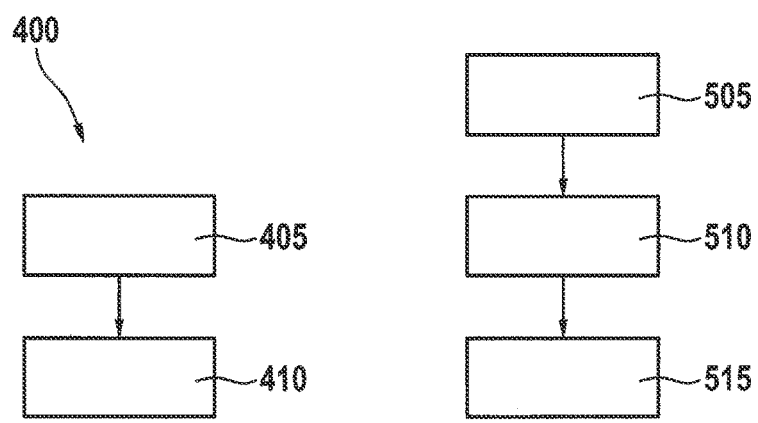
FIG. 4 shows a flow diagram of a method for producing a device according to an exemplary embodiment of the present invention.
FIG. 5 shows a flow diagram of a method for determining a mass flow of a fluid according to an exemplary embodiment of the present invention.

FIG. 4 shows a flow diagram of a method 400 for producing a device according to an exemplary embodiment of the present invention. In a step 405, the sensor element, the ASIC element, and the signal processing unit are provided. Subsequently, in a further step 410, the ASIC element is connected in electrically conductive fashion to the sensor element and to the signal processing unit.

FIG. 5 shows a flow diagram of a method for determining a mass flow of a fluid according to an exemplary embodiment of the present invention. The steps of the method can for example be realized using devices of the apparatus shown in FIG. 1.

In a step 505, a fluid is acquired using a sensor element situated within a flow path of the fluid, and a sensor signal is provided that indicates for example an acquisition of the fluid. In a step 510, the sensor signal is received at a first terminal of a first discrete circuit element, an operating signal for operating the sensor element is provided at a second terminal of the first discrete circuit element, and the sensor signal is converted into a converted signal and is provided at a third terminal of the first discrete circuit element. In a step 515, the converted signal is received at a first terminal of a second discrete circuit element, the mass flow of the fluid is determined using the converted signal, and a mass flow signal representing the mass flow is provided at a second terminal of the second discrete circuit element.

The exemplary embodiments described and shown in the Figures have been selected only as examples. Different exemplary embodiments can be combined with one another in their entirety or with regard to individual features. An exemplary embodiment may also be supplemented with features of a further exemplary embodiment. In addition, the method steps shown here may be repeated, and may be carried out in a sequence differing from that described.

If an exemplary embodiment includes an "and/or" linkage between a first feature and a second feature, this is to be read as meaning that according to one specific embodiment the exemplary embodiment has both the first feature and the second feature, and according to a further specific embodiment the exemplary embodiment has either only the first feature or only the second feature.

What is claimed is:

1. A device for determining a mass flow of a fluid, comprising:
a sensor element for acquiring information regarding the mass flow of the fluid, the sensor element being situated and configured within a flow path of the fluid to provide a sensor signal;
an integrated circuit having an operating unit for providing an operating signal for operating the sensor element, and having a conversion unit for converting the sensor signal into a converted signal, the integrated circuit being realized as a first discrete circuit element having a first terminal for receiving the sensor signal, a second terminal for providing the operating signal, and a third terminal for providing the converted signal, wherein the operating unit is a heating regulator to regulate a heating power level of the sensor element, and wherein conversion unit includes at least one analog-to-digital converter, the integrated circuit converting the sensor signal into the converted signal using the at least one analog-to-digital converter;

a signal processing unit to determine, using the converted signal, the mass flow of the fluid, the signal processing unit realized as a second discrete circuit element having a first terminal for receiving the converted signal and having a second terminal for providing a mass flow signal that represents the mass flow, wherein the signal processing unit is a programmable microcontroller, and wherein the first discrete circuit element and the second discrete circuit element are separate and distinct components relative to one another; and at least one interface unit to receive the mass flow signal provided at the second terminal of the signal processing unit, to adapt it to an interface protocol of a control device that can be connected downstream from the interface unit, and to output it as a signal that is readable by the control device and that represents the mass flow, the at least one interface unit being a separate and distinct component relative to both the first discrete circuit element and the second discrete circuit element.

2. The device of claim 1, wherein the sensor element is capable of being heated electrically, the sensor element having an electrical resistance that is a function of the fluid, and the sensor signal representing the electrical resistance of the sensor element.

3. The device of claim 1, wherein the first discrete circuit element and/or the second discrete circuit element of the signal processing unit is an SMD component.

4. The device of claim 1, further comprising:
a circuit board, a base plate, and a sensor element bearer, the integrated circuit and the signal processing unit being mounted on the circuit board, the circuit board being situated on the base plate, the sensor element being situated on the sensor element bearer, and the sensor element bearer being fastened on the base plate to form a sensor module.

5. The device of claim 4, further comprising:
a housing for accommodating the sensor module, the housing having at least one fluid channel, wherein at least the sensor element is situated in the fluid channel.

6. The device of claim 1, further comprising:
a further sensor element capable of being electrically heated and situated outside a flow path of the fluid, the operating unit being configured to control a heating power level of the further sensor element, the sensor element being configured to provide a further sensor signal that is a function of an electrical resistance of the further sensor element, the conversion unit being configured to convert the further sensor signal into a reference signal, and the signal processing unit being configured to determine the mass flow additionally using the reference signal.

7. The device as recited in claim 1, wherein each of the first discrete circuit element and the second discrete circuit element is an SMD component, the SMD components being separate components relative to one another, each of the SMD components having a separate SMD housing relative to one another.

8. The device as recited in claim 1, wherein the first discrete circuit element is an ASIC, the ASIC being separate and distinct from the second discrete circuit element.

9. A method for determining a mass flow of a fluid, the method comprising:
acquiring information regarding the mass flow of the fluid using a sensor element situated within a flow path of the fluid, and providing a sensor signal;
receiving the sensor signal at a first terminal of a first discrete circuit element, and providing an operating signal for operating the sensor element at a second terminal of the first discrete circuit element, wherein the first discrete circuit element includes a heating regulator, the heating regulator regulating a heating power level of the sensor element;
converting, by the first discrete circuit element, the sensor signal into a converted signal and providing the converted signal at a third terminal of the first discrete circuit element, wherein the first discrete circuit includes at least one analog-to-digital converter, and wherein the converting includes converting the sensor signal into the converted signal using the at least one analog-to-digital converter;
receiving the converted signal at a first terminal of a second discrete circuit element, determining the mass flow of the fluid using the converted signal, and providing a mass flow signal that represents the mass flow at a second terminal of the second discrete circuit element, wherein the second discrete circuit element is a programmable microcontroller, and wherein the first discrete circuit element and the second discrete circuit element are separate and distinct components relative to one another; and
receiving, via at least one interface unit, the mass flow signal provided at the second terminal of the second discrete circuit element, the least one interface unit adapting the mass flow signal to an interface protocol of a control device that can be connected downstream from the interface unit, and outputting it as a signal that is readable by the control device and that represents the mass flow, the at least one interface unit being a separate and distinct component relative to both the first discrete circuit element and the second discrete circuit element.

10. The method as recited in claim 9, wherein each of the first discrete circuit element and the second discrete circuit element is an SMD component, the SMD components being separate components relative to one another, each of the SMD components having a separate SMD housing relative to one another.

11. The method as recited in claim 9, wherein the first discrete circuit element is an ASIC, the ASIC being separate and distinct from the second discrete circuit element.

12. The method as recited in claim 11, wherein the second discrete circuit is a microcontroller.

13. A method for producing a device for determining a mass flow of a fluid, the method comprising:
making a device arrangement by:
providing a sensor element, an integrated circuit, a signal processing unit, and at least one interface unit; and
providing an electrically conductive connection of the integrated circuit to the sensor element and to the signal processing unit;
wherein the device arrangement includes:
the sensor element, which is for acquiring information regarding the mass flow of the fluid, the sensor element being situated and configured within a flow path of the fluid to provide a sensor signal;

the integrated circuit, which has an operating unit for providing an operating signal for operating the sensor element, and has a conversion unit for converting the sensor signal into a converted signal, the integrated circuit being realized as a first discrete circuit element having a first terminal for receiving the sensor signal, a second terminal for providing the operating signal, and a third terminal for providing the converted signal, wherein the operating unit is a heating regulator to regulate a heating power level of the sensor element, and wherein conversion unit includes at least one analog-to-digital converter, the integrated circuit converting the sensor signal into the converted signal using the at least one analog-to-digital converter;

the signal processing unit, which is configured to determine, using the converted signal, the mass flow of the fluid, the signal processing unit being realized as a second discrete circuit element having a first terminal for receiving the converted signal and having a second terminal for providing a mass flow signal that represents the mass flow, wherein the signal processing unit is a programmable microcontroller, and wherein the first discrete circuit element and the second discrete circuit element are separate and distinct components relative to one another; and the at least one interface unit, which is configured to receive the mass flow signal provided at the second terminal of the signal processing unit, to adapt it to an interface protocol of a control device that can be connected downstream from the interface unit, and to output it as a signal that is readable by the control device and that represents the mass flow, the at least one interface unit being a separate and distinct component relative to both the first discrete circuit element and the second discrete circuit element.

14. The method as recited in claim 13, wherein each of the first discrete circuit element and the second discrete circuit element is an SMD component, the SMD components being separate components relative to one another, each of the SMD components having a separate SMD housing relative to one another.

15. The method as recited in claim 13, wherein the first discrete circuit element is an ASIC, the ASIC being separate and distinct from the second discrete circuit element.

16. The method as recited in claim 15, wherein the second discrete circuit is a microcontroller.

* * * * *